United States Patent [19]
Lefkowitz

[11] Patent Number: 6,091,417
[45] Date of Patent: *Jul. 18, 2000

[54] GRAPHICAL USER INTERFACE

[75] Inventor: Howard Michael Lefkowitz, Woodland Hills, Calif.

[73] Assignee: EarthLink Network, Inc., Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 09/039,565

[22] Filed: Mar. 16, 1998

[51] Int. Cl.$^7$ ...................................................... G06F 13/00
[52] U.S. Cl. .......................................... 345/357; 345/349
[58] Field of Search ..................................... 345/335, 357, 345/356, 349, 348, 350–351, 326–332, 340–347, 333–334, 336–337, 352–355

[56] References Cited

U.S. PATENT DOCUMENTS

| | | | |
|---|---|---|---|
| 5,710,887 | 1/1998 | Chellish et al. | 395/226 |
| 5,774,122 | 6/1998 | Kojima et al. | 345355/571 |
| 5,774,370 | 6/1998 | Moutulli | 395/200.57 |
| 5,778,178 | 7/1998 | Anonachalam | 395/200.33 |
| 5,838,326 | 11/1998 | Card et al. | 345/355 |
| 5,847,709 | 12/1998 | Card et al. | 345/355 |
| 5,884,029 | 3/1999 | Brush, II et al. | 395/200.32 |
| 5,889,863 | 3/1999 | Weber | 380/25 |

*Primary Examiner*—Steven Sax
*Attorney, Agent, or Firm*—Hunton & Williams

[57] ABSTRACT

A virtual mall consists of a graphical user interface having a web page with graphical image that represents the physical structure of a mall. Various sub-regions in the graphical image represent retail stores. The stores are hypertext linked to retail web pages which allow the user to shop for items in much the same way as shopping in a mall. Various icons on the web page allow the user to move form store to store, as well as to various levels of the mall. There are also sub-regions for information, news and magazine subscriptions as well as any other features or services that may be found in malls.

17 Claims, 2 Drawing Sheets

GRAPHICAL USER INTERFACE

BACKGROUND OF THE INVENTION

1. Field of the Invention

The present invention relates to a graphical user interface for an electronic shopping mall, and more particularly to a graphical user interface which resembles the layout of a mall to facilitate the users navigation of and acclimation to a particular web site.

2. Background of the Invention

The use of the Internet and the World Wide Web (the "Web") is continuing to expand at an exponential rate with new users logging on each day. Many web pages allow users to browse and purchase merchandise without the user ever having to leave the computer terminal.

Before the advent of on-line shopping, consumers typically had to go to stores and shopping malls. Some consumers, however, do not enjoy shopping and would prefer to do so from their homes. Likewise, many consumers are pressed to find significant time to enjoy the shopping experience, thereby making if difficult to spend quality time in a shopping mall. Furthermore, shopping malls and stores often present obstacles for consumers, including the handicapped and the elderly, who may be intimidated by crowds. Additionally, shopping malls are generally located in densely populated areas. For many consumers, particularly those in rural areas, time and distance are prohibitive factors in traveling to a shopping mall.

Mail order catalogs and television shopping channels have sought to address these challenges, with varying degrees of success. However, mail order catalogs suffer from the problem that consumers are limited in their shopping choices by the types of catalogs they receive through the mail. Television shopping channels are not available in every city and consumers have no control over what items are viewed.

These and other disadvantages are sought to be overcome by the preferred embodiments of the invention.

It is therefore an object of the preferred embodiments to provide a mechanism by which consumers may shop without having to visit the shopping mall.

It is a further object of the preferred embodiments to reduce the time and effort expended by consumers in meeting their shopping needs.

It is still further an object of the preferred embodiments is to allow consumers to shop at a variety of stores, as would be the case in visiting a shopping mall, without having to leave the home and without having to collect mail order catalogs.

SUMMARY OF THE INVENTION

The present invention is directed to a graphical user interface for use on a computer connected to a network that supports hypertext links. The graphical user interface comprises a web page having a graphical image which encompasses a predetermined area, and which represents a physical structure. In one preferred embodiment, the physical structure is a shopping mall having at least two floors. The graphical image has a plurality of sub-graphical regions positioned about the graphical image which, in one preferred embodiment, represent stores in the shopping mall. In each of these sub-regions a hypertext link connects the web site represented by the sub-region. When one of these sub-regions is activated, the corresponding web site is imported into the web page, displaying the specific information from the connected web site. In one preferred embodiment, the specific store is brought into the web page for the user to shop.

An icon (also known as graphical buttons), if selected, preferably causes the web page to display a preselected graphical image. In one preferred embodiment, the preselected image is of the first floor of the shopping mall. This enables the user to a return to a familiar site and then enter a new store, much like what happens in the real world.

Another feature of the present invention is the use of icons to navigate through the different levels of the graphical image. In order to facilitate the users acclimation to the graphical user interface, these icons represent transportation conduits, thus transporting the user between different levels as represented by the graphical image. In one preferred embodiment of the present invention, these transportation conduits represent escalators, elevators or flights of stairs. Each of these transportation conduits provide artificial resemblance to the real world, thus providing the user with a familiar means of navigation.

Still another feature of the present invention is the use of sub-regions representing conventional details in the physical world, but which are merely decorative in the virtual world. For one preferred embodiment, these types of details may include restrooms or a food court in the shopping mall. These additional levels of detail do not actually function as their comparable physical world embodiments, yet provide some additional familiarity to the user as the user navigates through the graphical user interface.

Yet another feature of the present invention is the use of sub-regions that represent conventional details in the physical world and that have similar functions in the virtual worlds. In one preferred embodiment, some of these images include a center court, an information booth and a newsstand. In each of these locations, specific information which would be available in their physical world counterpart is also available in the virtual world.

By providing a virtual simulation for the physical world structure, a user will likely be accustomed to receiving certain information from such a site.

Other features and advantages of the present invention will be apparent to those skilled in the art from a careful reading of the Detailed Description of the Preferred Embodiments presented below and accompanied by the drawings.

DETAILED DESCRIPTION OF THE PREFERRED EMBODIMENT

Figure 1:
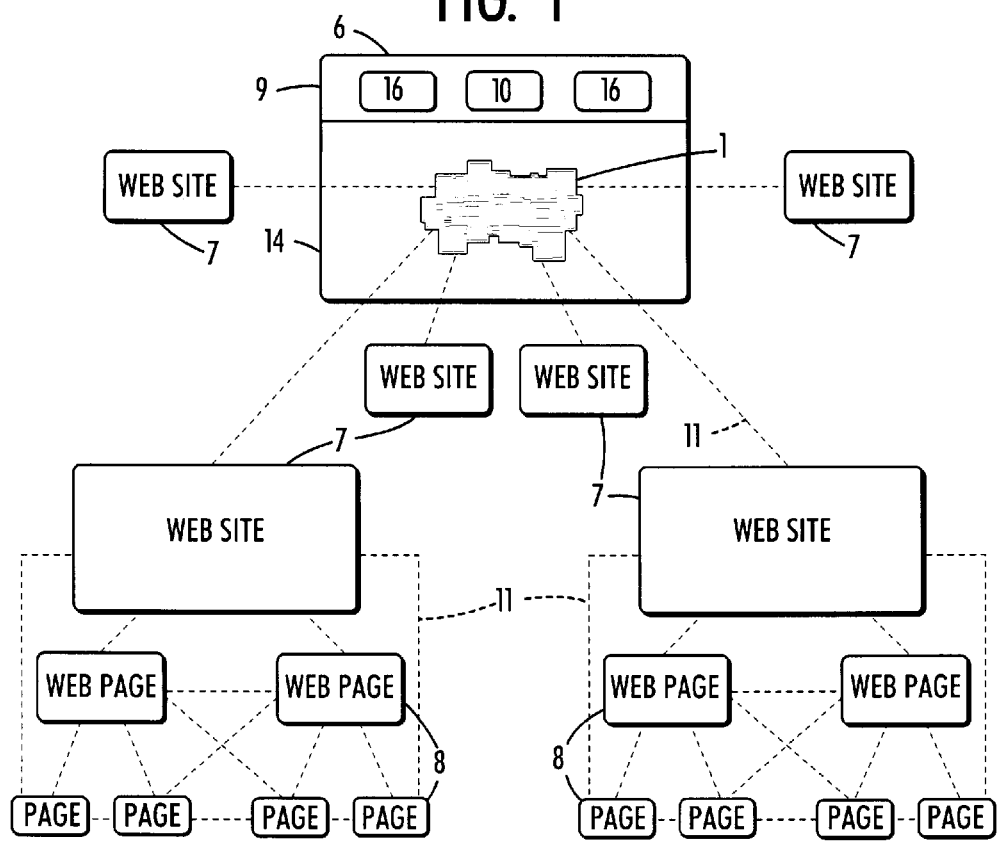
FIG. 1 is a plan view of a graphical user interface according to one preferred embodiment of the present invention.

Referring now to FIG. 1, a first preferred embodiment of the invention includes a graphical user interface comprising a web page 6 having a graphical image 1 depicting a physical structure. In this embodiment, that structure is the floor plan for a mall. The graphical image 1 encompasses a predetermined area on the web page. The graphical image 1 includes sub-regions 2 (FIG. 2) located within the predetermined area. These sub-regions 2 are hypertext linked (or linked) to other web page sites 7. In other embodiments, the sub-regions 2 may be connected to web page sites 7 in a different manner. In one preferred embodiment, at least some of the sub-regions 2 depict retail shops that, for example, might be found in a mall.

The graphical user interface is used with a browser on a computer. The computer, in turn, is connected to a network which, in this preferred embodiment, is capable of supporting hypertext links. Networks capable of supporting other manners of connection are also envisioned. The particular type of browser, computer, or network is not important to this invention. Rather, the type of browser, network, or computer to use will be readily apparent to one of ordinary skill in the art.

In a preferred embodiment, when a sub-region is selected, a retail site is imported into the second frame 14 of the web page. Importation of the retail site into the second frame 14 of the web page may occur in a number of different ways, including, in this preferred embodiment, by a hypertext link. The first frame 9 remains unchanged, giving the appearance to the user of remaining at the original site. The user may then interact with the retail site. An icon 10 in the first frame of the web page of the retail site is always viewable to the user. The icon 10 is connected to the graphical image 1. and in the preferred embodiment, the icon 10, when activated, returns the user to the main area of the mall. The connection controls the web page 6 in that it determines what is displayed on the web page 6. Icon 10 may be linked to the main area of the mall, or, in other embodiments, connected in a different manner. For example, when a user is ready to exit a virtual store, the user moves to the door and is returned to the main area of the mall. It will be apparent to a person of ordinary skill in the art that a banner, a single frame, or a table may be used with the present invention without departing from the spirit and scope of the present invention.

These retail sites may in turn be linked to other web pages or sites 8. In addition to the graphical image 1, the web page 6 may include one or more other active areas on the web page 6. One such active area may include a banner 9 (FIG. 1), to give general information about the page, such as the title and the maker/owner of the page. Another such active area may include one or more icons 16. Icons 16 may be used to move to sites within the web page 6, or may be linked to other sites, such as, for example, the home page of the owner of the mall web site.

Figure 2:
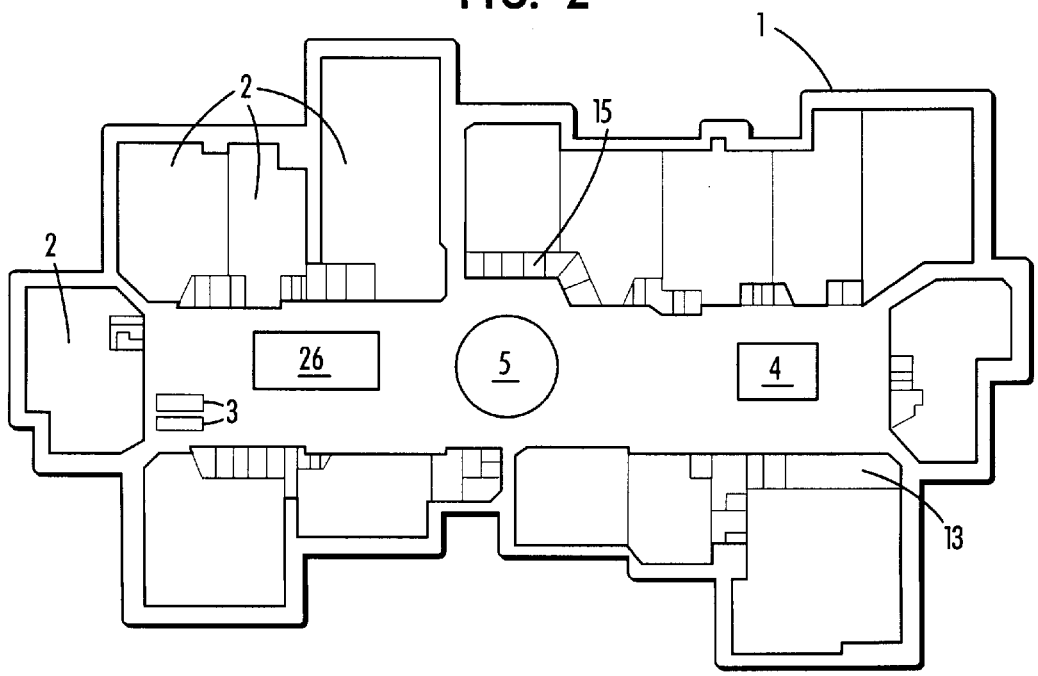
FIG. 2 is a schematic view of the graphical user interface of FIG. 1 according to the first preferred embodiment of the present invention.

With particular reference to FIG. 2, a more detailed view of the graphical image I is illustrated. Other sub-regions in the graphical image may include one or more transportation icons 3, which transport the user between different floors of the mall. Transportation icons 3 may appear as escalators, elevators, stairs, or the like. Other sub-regions may include an information area 4, which provides information about the mall. An information area 4 may be used, for example, to answer questions users may have about the stores, delivery of items, or the mall in general. Users may also, for example, be able to make comments and suggestions about the mall. Additionally, another sub-region of the graphical image may be a central area 5 which serves as a posting area for sales, general announcements, and special events, for example, such as on-line chat sessions with retailers, authors or the like. In one preferred embodiment, a sub-region functions as a newsstand 26. At the newsstand 26, users may subscribe to magazines, newspapers or the like. Additional embodiments may include links from the newsstand to subscriptions or on-line publications. This list of sub-region functions is not meant to be exhaustive or limit the invention, but rather to illustrate the various possibilities and embodiments.

Other sub-regions may include restrooms 13 or a food court 15. The restroom 13. for example may be linked to a web page which includes a picture of a men's room door and a women's room door. While these sub-regions obviously do not function as their counterparts in an actual mall function, they do provide additional familiarity as the user navigates through the virtual mall.

Figure 3:
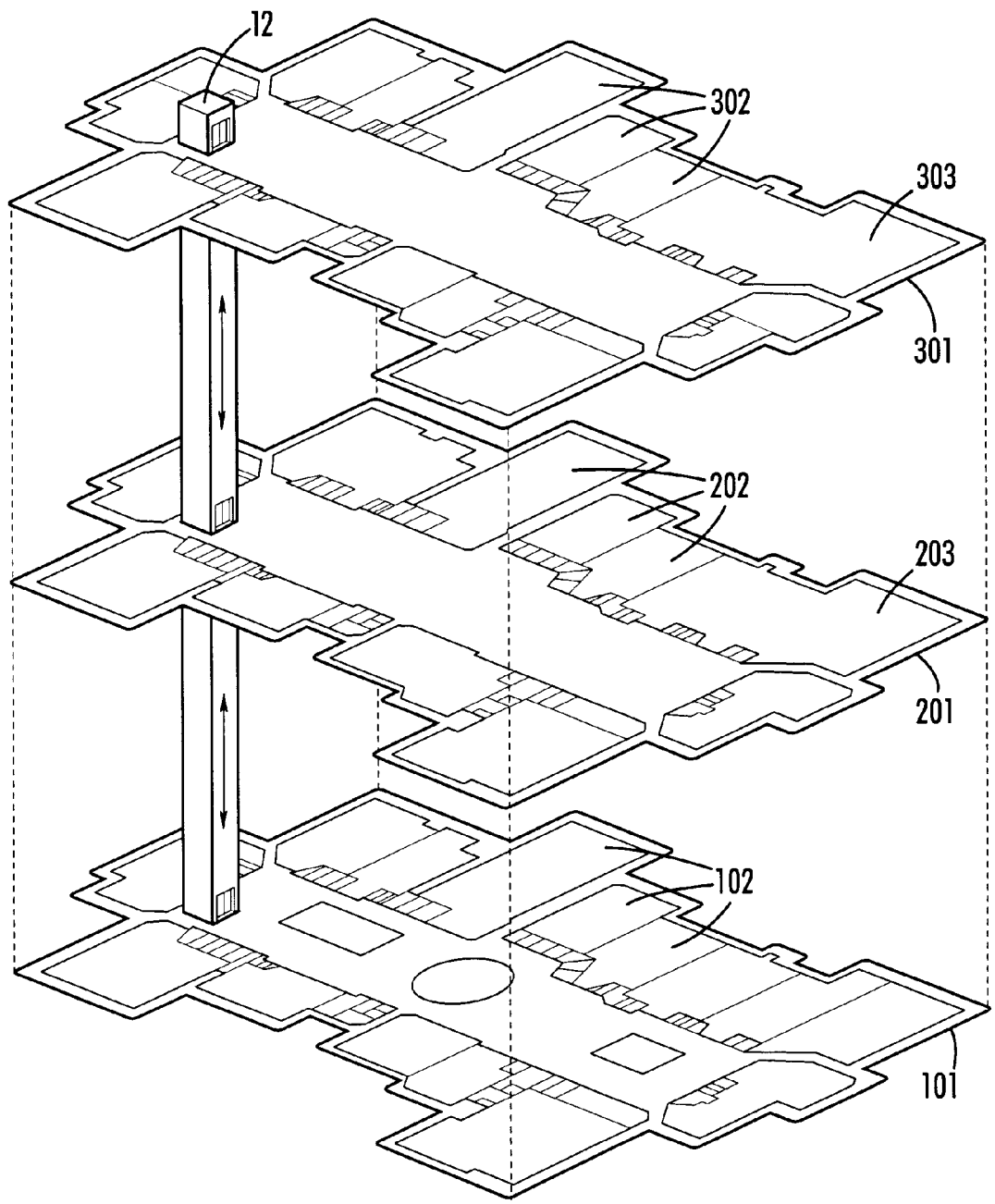
FIG. 3 is a perspective view of the graphical user interface showing multiple levels according to the first preferred embodiment of the present invention.

FIG. 3 presents a depiction of a virtual mall with multiple levels. While this view is not how the virtual mall would appear to a user on a web page 11 it is illustrative of how the virtual mall functions. The virtual mall in this embodiment consists of three separate graphical images 101, 201, 301, each similar in function to the graphical image 1 of FIG. 2. Each graphical image represents a floor of the virtual mall. A single graphical image is located on a web page at a time. In this embodiment, the floors are connected by a transportation icon represented as an elevator 12. Alternatively, escalators (as shown, e.g., in FIG. 1), stairs, or other transportation devices may also be used. Activating the elevator 12 icon allows the user to move between floors of the virtual mall in much the same way as a shopper would move between different floors of a real mall.

Each graphical image 101, 201, 301, encompasses a predetermined area of the web page and also includes sub-regions 102, 202, 302 which depict retail stores common to a mall. These sub-regions 102, 202, 302 are in turn linked to retail sites. Some sub-regions 203, 303, may represent the same store which can be accessed from the different floors. Just as real malls have "anchor stores" which have many levels, the virtual mall may include larger retail sites which have entrances on more than one floor.

While the invention has been described in connection with the preferred embodiments, it will be apparent to those skilled in the art that many changes and substitutions can be made to the preferred embodiments herein described without departing from the spirit and scope of the present invention as defined by the appended claims.

I claim:

1. A graphical user interface for use with a browser on a computer connected to a network capable of supporting hypertext links, said graphical user interface comprising:

a web page capable of being displayed on the browser of the computer, said web page having embedded therein:

a) a graphical menu image representing the physical structure of a shopping mall and having a plurality of sub-regions representing stores in the shopping mall, each of said plurality of sub-regions having a hypertext link corresponding to a retail web site of one of said stores embedded therein so that when one of said sub-regions is activated said web page is linked to one of said retail web sites and said one retail web site is imported into said web page; and b) an icon connected to said graphical menu image so that when said icon is activated, said web page displays said graphical menu image.

2. The graphical user interface as recited in claim 1, wherein a user may interact with said one retail web site.

3. The graphical user interface as recited in claim 1, wherein two or more of said sub-regions have hypertext links which correspond to the same retail web site.

4. The graphical user interface as recited in claim 1, further comprising a sub-region with a hypertext link to a web site which provides information about said web page and said graphical menu image.

5. A graphical user interface for use with a browser on a computer connected to a network capable of supporting hypertext links, said graphical user interface comprising:
   a web page capable of being displayed on the browser of the computer, said web page having embedded therein:
   a first graphical menu image representing the physical structure of a first floor of a shopping mall;
   a second graphical menu image representing the physical structure of a second floor of a shopping mall;
   a first icon positioned on said first graphical menu image, said first icon linking said first graphical menu image to said second graphical menu image so that when said first icon is activated said second graphical menu image is imported into the web page; and
   a second icon positioned on said second graphical menu image, said second icon linking said second graphical menu image to said first graphical menu image so that when said second icon is activated said first graphical menu image is imported into said web page.

6. The graphical user interface as recited in claim 5, further comprising an icon embedded in said web page, so that when said icon is activated said first graphical menu image is imported into said web page.

7. The graphical user interface as recited in claim 5, wherein said first icon and said second icon depict a transportation conduit selected from the group consisting of an escalator, a flight of stairs, and an elevator.

8. The graphical user interface as recited in claim 5, said first graphical menu image having a first plurality of stores and said second graphical menu image having a second plurality of stores wherein each of said first plurality of stores and said second plurality of stores has a hypertext link embedded therein; and
   each of said hypertext links corresponding to a retail web site so that when one of said first plurality of stores or said second plurality of stores is activated, said web page is linked to said retail web site and imports said retail web site into said web page.

9. The graphical user interface recited in claim 8, wherein two or more of said first plurality of stores and said second plurality of stores have hypertext links which correspond to the same said retail web site.

10. A graphical user interface for use with a browser on a computer connected to a network capable of supporting hypertext links, said graphical user interface comprising:
    a web page having a fist and second frame, said web page capable of being displayed on the browser of the computer;
    a first graphical menu image depicting a first floor of a shopping mall embedded on said second frame of said web page;
    a second graphical menu image depicting a second floor of a shopping mall embedded on said second frame of said web page;
    a first icon positioned on said first graphical menu image, said first icon depicting a first transportation conduit and linking said first graphical menu image to said second graphical menu image so that when said first icon is activated said second graphical menu image is imported into said second frame of said web page;
    a second icon positioned on said second graphical menu image, said second icon depicting a second transportation conduit and linking said second graphical menu image to said first graphical menu image, so that when said second icon is activated said first graphical menu image is imported into said second frame of said web page; and
    a third icon positioned in said first frame of said web page, said third icon controlling said second frame of said web page so that when said third icon is activated said first graphical menu image is imported into said second frame of said web page.

11. The graphical user interface as recited in claim 10, wherein said first transportation conduit and said second transportation conduit are selected from the group consisting of a flight of stairs, an escalator and an elevator.

12. The graphical user interface as recited in claim 10, wherein said first floor of a shopping mall has a store positioned therein, said store having a hypertext link embedded therein, so that when said store is activated said hypertext link imports a web site corresponding to said store into said second frame of said web page.

13. A method for navigating the world wide web using a graphical user interface, the method comprising the steps of:
    accessing a web page capable of being displayed on the browser of a computer;
    displaying said web page, said web page having embedded therein:
    a) a first graphical menu image having a plurality of sub-regions said first graphical menu image depicting a first floor of a shopping mall and said sub-regions representing stores, each of said plurality of sub-regions having a hypertext l embedded therein, wherein each of said hypertext links corresponds to a retail web site of said store; and
    b) an icon for controlling said web age;
    activating one of said plurality of sub-regions to link said web page to said retail web site and import said retail web site into said web page; and
    activating said icon and importing said first graphical menu image into said web page.

14. The method recited in claim 13, wherein said web sites represent retail web sites said method further comprising the step of
    using said retail web site to purchase items.

15. The method as recited in claim 14, wherein said web page having further embedded therein a second graphical menu image on said web page, said second graphical menu image depicting a second floor of a shopping mall and having sub-regions representing stores, each of said sub-regions having a hypertext link embedded therein, wherein each of said hypertext links corresponds to a retail web site of one of said stores and wherein:
    a first icon is positioned on said first graphical menu image, said first icon being linked to said second graphical menu image; and
    a second icon is positioned on said second graphical menu image, said second icon being linked to said first graphical menu image.

16. The method recited in claim 15, further comprising the steps of:
    activating said first icon; and
    importing said second graphical menu image into said web page.

17. The method recited in claim 15, further comprising the steps of:
    activating said second icon; and
    importing said first graphical menu image into said web page.

* * * * *